Patented Oct. 29, 1935

2,018,792

UNITED STATES PATENT OFFICE 2,018,792

PROCESS FOR THE MANUFACTURE OF HYDROXYPYRENE

Walter Kern, Sissach, near Basel, Switzerland, assignor to the firm of Society of Chemical Industry in Basle, Basel, Switzerland No Drawing. Application October 6, 1934, Serial No. 747,249. In Switzerland October 17, 1933

8 Claims. (Cl. 260—154)

This invention relates to the manufacture of hydroxypyrene by sulfonating pyrene under mild conditions in a first step, and subjecting the pyrene-monosulfonic acid thus obtained to a caustic alkali fusion in a second step.

The sulfonation of pyrene under mild conditions may be carried out, for example, with concentrated sulfuric acid or chloro-sulfonic acid in presence of diluents or solvents, such as carbon tetrachloride, nitrobenzene, dichlorobenzene, trichlorobenzene or dioxane. It is advantageous in this sulfonation, in order to avoid the formation of considerable quantities of pyrene-disulfonic acid, not to use a great excess of sulfonating agents and further not to exceed considerably temperatures of about 80° C. Particularly good results in respect of the yield of pyrene-monosulfonic acid are obtained when the sulfonating agent is a compound containing the atomic grouping

Such substances may be made, for example, by the action of chlorosulfonic acid or fluorosulfonic acid on tertiary bases, for instance on pyridine, quinoline, dialkyl anilines (dimethylaniline, diethyltoluidine) and trialkylamines (trimethylamine, triethylamine), and for the sulfonation there may be used either the mixtures produced by the action of halogen-sulfonic acid on tertiary bases or compounds having the said atomic grouping isolated from this mixture, in the presence or absence of solvents or diluents, such as nitrobenzene, dichlorobenzene or trichlorobenzene. When using these sulfonating agents it is also advantageous not to use too great an excess, and not to exceed a temperature of about 200° C.

The pyrene monosulfonic acid obtainable according to the present process, when subjected to a caustic alkali fusion, for example, with sodium hydroxide or potassium hydroxide, yields a hydroxypyrene.

The intermediate products obtainable by the invention may be used, if desired after conversion into further intermediate products, for making, for example, dyestuffs or pharmaceutical products.

The following examples illustrate the invention, the parts being by weight.

Example 1

To 1000 parts by volume of pyridine there are added, drop by drop, while stirring and cooling to 20–30° C., 348 parts of chlorosulfonic acid and then the excess of pyridine is distilled in a vacuum at 60–70° C. Two-thirds of the product obtained are mixed with 440 parts of pyrene and the mixture is heated. At about 100° C. the mass begins to liquefy. It is heated, while stirring, to 135–140° C. and kept at this temperature for 5 hours. The rest of the product of the reaction of the pyridine with the chlorosulfonic acid is now added and the whole is heated, while stirring, for 12 hours at 135–140° C. The melt thus obtained is cooled and mixed with about 3000 parts of water and the mixture is boiled and made alkaline with caustic soda lye. The pyridine is distilled in steam and the contents of the still are filtered hot. The residue on the filter is then boiled with 4 litres of water and filtered. The two filtrates are united and, if desired, after concentration, allowed to cool. There crystallizes a sodium pyrenemono-sulfonate of the formula

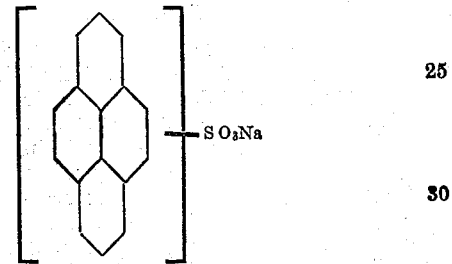

in lustrous colorless laminae, which are filtered, washed with a little water and dried. The residue insoluble in water is unchanged pyrene.

If there is used instead of the product of the reaction of chlorosulfonic acid on pyridine the product of the reaction of the same acid on quinoline, dimethylaniline or triethylamine, the same pyrene-monosulfonate is obtained.

The same product is also obtained when pyridine-sulfotrioxide, isolated from the mixture obtainable by the action of halogen-sulfonic acid on pyridine, is used for the sulfonation, in which case it is advantageous to conduct the sulfonation at a temperature of 175–180° C.

Example 2

To 200 parts of pyridine there are added, by drops and while stirring and cooling to 20–30° C., 29 parts of chlorosulfonic acid and the excess pyridine is then distilled in a vacuum at 60–70° C. The residue is mixed with 50 parts by volume of nitrobenzene and then 40.4 parts of pyrene are added. The whole is now heated, while stirring, to 135° C. and kept for 16 hours at 135–140° C. The mixture thus obtained is cooled and diluted with water and then made alkaline by addition of caustic soda lye; the nitrobenzene and the pyridine are now distilled in steam. The residue in the still is filtered hot, extracted with boiling water and again filtered. The united filtrates are concentrated and allowed to cool, whereupon there is obtained a sodium pyrene-mono-sulfonate having properties identical with those of the product described in Example 1.

The residue insoluble in water consists of unchanged pyrene.

By acidifying the aqueous solution of the sodium pyrene-mono-sulfonate the corresponding pyrene-mono-sulfonic acid may be isolated.

*Example 3*

20.2 parts of pyrene are introduced, while stirring, into 200 parts by volume of carbon tetrachloride. The suspension thus obtained, in which the pyrene is in part dissolved, is heated, while stirring, to 50° C., and at this temperature 12 parts of chloro-sulfonic acid are added in drops within half-an-hour. The whole is then heated to 75–80° C. and kept at this temperature for 8 hours. The mixture is allowed to cool, taken up in water while stirring, made alkaline by addition of caustic soda lye and steam-distilled to separate the carbon tetrachloride. The contents of the still are filtered hot, boiled with water and again filtered. The united filtrates are concentrated and allowed to cool. There separates the sodium salt of the same pyrene-mono-sulfonic acid as is obtained in the manner described in Examples 1 and 2. The residue insoluble in water is in this case also unchanged pyrene.

The same sodium pyrene-mono-sulfonate is obtained, if in this example sulfuric acid monohydrate is substituted for the chlorosulfonic acid.

*Example 4*

In a copper or iron crucible 60 parts of caustic potash are heated to 280° C. Into this melt there are introduced, while stirring, 30 parts of the sodium pyrene-mono-sulfonate obtainable as described in the preceding examples, and the temperature is maintained for about 15 minutes. After cooling to about 100° C. the mixture is mixed with water, the solution is boiled, some animal charcoal being added, and is then filtered. The filtrate is mixed with hydrochloric acid until there is an acid reaction whereby an hydroxypyrene of the formula

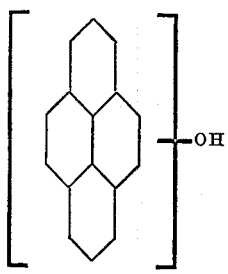

is precipitated. This is filtered and washed with water. After re-crystallization from benzene colorless needles of melting point 180–182° C. are obtained.

The same hydroxypyrene is produced if in this example caustic soda is substituted for caustic potash. In this case it is advantageous to conduct the fusion at a temperature of 290° C.

What I claim is:—

1. In the manufacture of a hydroxypyrene, the step wherein pyrene is sulfonated by using compounds containing the atom grouping

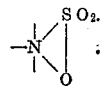

2. In the manufacture of a hydroxypyrene, the step wherein pyrene is sulfonated by using pyridine sulfotrioxide.

3. In the manufacture of a hydroxypyrene, the step wherein pyrene monosulfonic acid is subjected to a caustic alkali fusion.

4. In the manufacture of a hydroxypyrene, the step wherein pyrene monosulfonic acid is subjected to a caustic potash fusion.

5. Process for the manufacture of a hydroxypyrene, consisting in sulfonating pyrene by using compounds containing the atom grouping

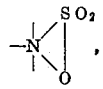

and subjecting the pyrene monosulfonic acid thus obtained to a caustic alkali fusion.

6. Process for the manufacture of a hydroxypyrene, consisting in sulfonating pyrene by using pyridine sulfotrioxide, and subjecting the pyrene monosulfonic acid thus obtained to a caustic alkali fusion.

7. Process for the manufacture of a hydroxypyrene, consisting in sulfonating pyrene by using pyridine sulfotrioxide, and subjecting the pyrene monosulfonic acid thus obtained to a caustic potash fusion.

8. Hydroxypyrene of the formula

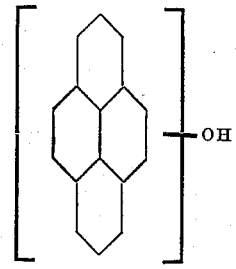

which product is easily soluble in dilute alkalies and crystallizes from benzene in colorless needles of melting point 180–182° C.

WALTER KERN.